(12) United States Patent  
Shimokawa

(10) Patent No.: US 8,228,577 B2  
(45) Date of Patent: Jul. 24, 2012

(54) HOLOGRAM RECORDING APPARATUS

(75) Inventor: Satoshi Shimokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 734 days.

(21) Appl. No.: 12/008,729

(22) Filed: Jan. 14, 2008

(65) Prior Publication Data

US 2008/0174841 A1    Jul. 24, 2008

(30) Foreign Application Priority Data

Jan. 23, 2007    (JP) ................................. 2007-012359

(51) Int. Cl.  
     *G03H 1/04*    (2006.01)

(52) U.S. Cl. ......................................................... 359/35

(58) Field of Classification Search .................. 359/1–35  
See application file for complete search history.

(56) References Cited

U.S. PATENT DOCUMENTS

| | | | | |
|---|---|---|---|---|
| 5,754,318 | A | * | 5/1998 | Agopian .......................... 359/10 |
| 6,445,470 | B1 | * | 9/2002 | Jenkins et al. .................. 359/11 |
| 6,628,579 | B2 | | 9/2003 | Watanabe et al. |

FOREIGN PATENT DOCUMENTS

| | | |
|---|---|---|
| JP | 7-110712 | 4/1995 |
| JP | 7-277286 | 10/1995 |
| JP | A 2000-339729 | 12/2000 |
| JP | 2001-342886 | 12/2001 |
| JP | 2003-287997 | 10/2003 |
| JP | A 2005-234145 | 9/2005 |

OTHER PUBLICATIONS

Office Action and partial English translation issued in corresponding Japanese Application No. 2007-012359 on Dec. 6, 2011.

* cited by examiner

*Primary Examiner* — Jennifer L. Doak  
(74) *Attorney, Agent, or Firm* — Greer, Burns & Crain, Ltd.

(57) ABSTRACT

A hologram recording apparatus where holograms corresponding to incident angles of reference light are multiple-recorded onto a medium, including a recording light projection unit projecting the recording light onto a region of the medium; a reference light projection unit projecting the reference light onto the medium by intermittently changing an incident angle; an incident-angle variation projection unit changing the incident angle of the reference light; an incident-angle switching instruction unit giving an instruction for switching the incident angle; a feed-back control unit operating the incident-angle variation projection unit by feed-back control when the switching instruction of the incident angle has been given; and a feed-forward compensation unit learning a feed-back control signal which is outputted every switching instruction of the incident angle from the feed-back control unit, wherein a feed-forward compensation is made as to a next feed-back control signal on the basis of a result of the learning.

8 Claims, 11 Drawing Sheets

HOLOGRAM RECORDING APPARATUS

TECHNICAL FIELD

The present invention relates to a hologram recording apparatus in which holograms are multiply-recorded onto a hologram recording medium by changing the incident angle of reference light intermittently.

BACKGROUND OF THE INVENTION

An example of a prior-art hologram apparatus is an apparatus stated in Japanese patent publication number 2005-234145. The apparatus stated in the official gazette has the following three parts: The first part is a means for projecting recording light at a certain incident angle onto a region of a hologram recording medium. The second part is a means for projecting reference light to the region by intermittently changing an incident angle by variably controlling inclination of a mirror. In addition, the third part is a means for multiply-recording holograms corresponding to the incident angles of the reference light by the interferences between the recording light and the reference light.

SUMMARY

According to an aspect of an embodiment, an apparatus comprises:
a recording light projection unit projecting recording light modulated in accordance with recording information, onto a region of a hologram recording medium;
a reference light projection unit projecting reference light onto the hologram recording medium by intermittently changing an incident angle with respect to the region;
an incident-angle variation projection unit changing the incident angle of the reference light;
an incident-angle switching instruction unit giving a switching instruction of the incident angle;
a feed-back control unit causing the incident-angle variation projection unit to operate by a feed-back control, when the switching instruction of the incident angle has been given; and
a feed-forward compensation unit learning a feed-back control signal which is outputted every switching instruction of the incident angle from the feed-back control unit, and for making feed-forward compensation as to the next feed-back control signal on the basis of a result of the learning.

DETAILED DESCRIPTION OF THE EMBODIMENTS

Now, the preferred embodiments of the present invention will be concretely described with reference to the drawings.

Figure 1:
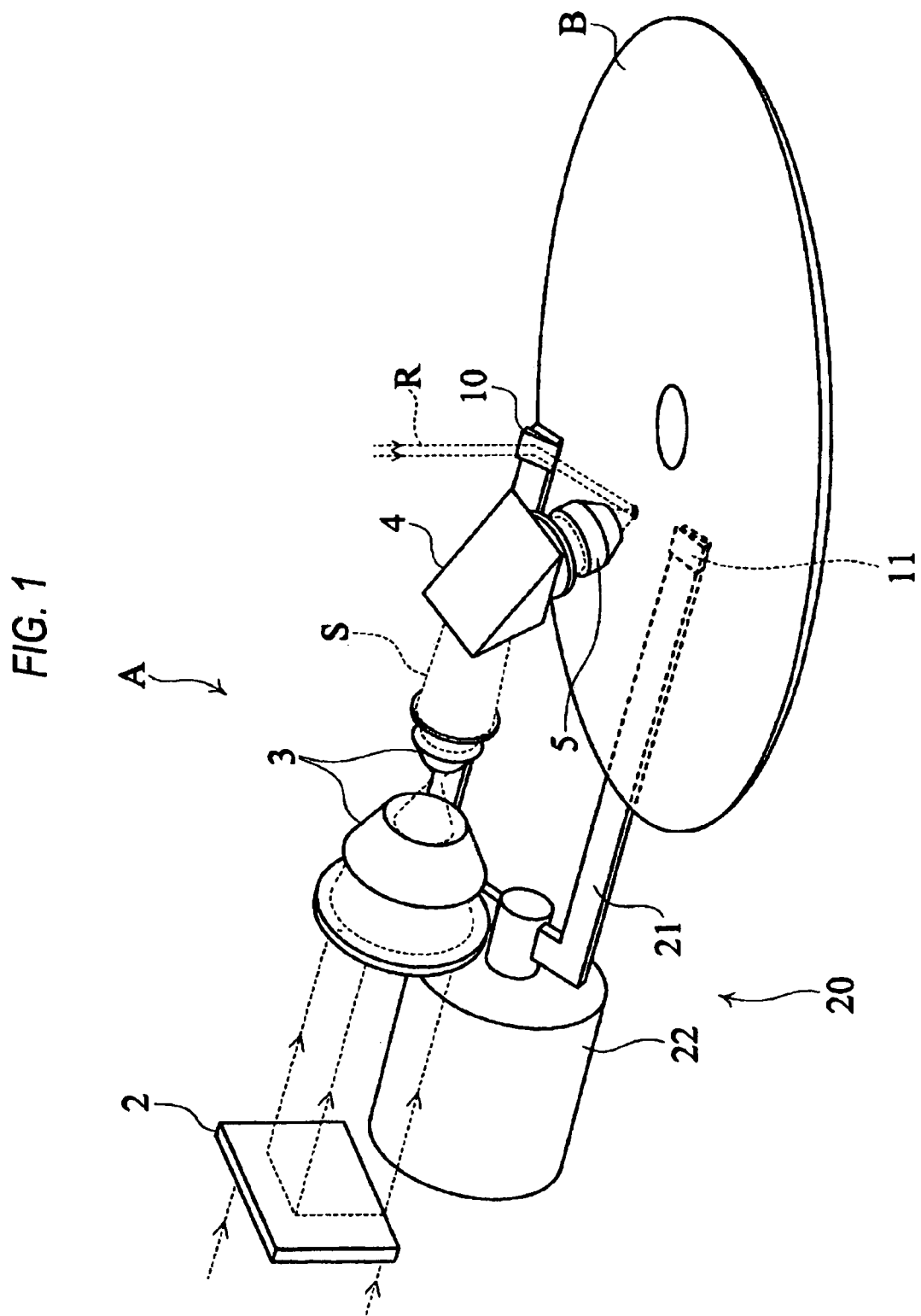
FIG. 1 is a general configurational diagram showing an embodiment of the hologram recording apparatus according to the present invention.
Figure 2:
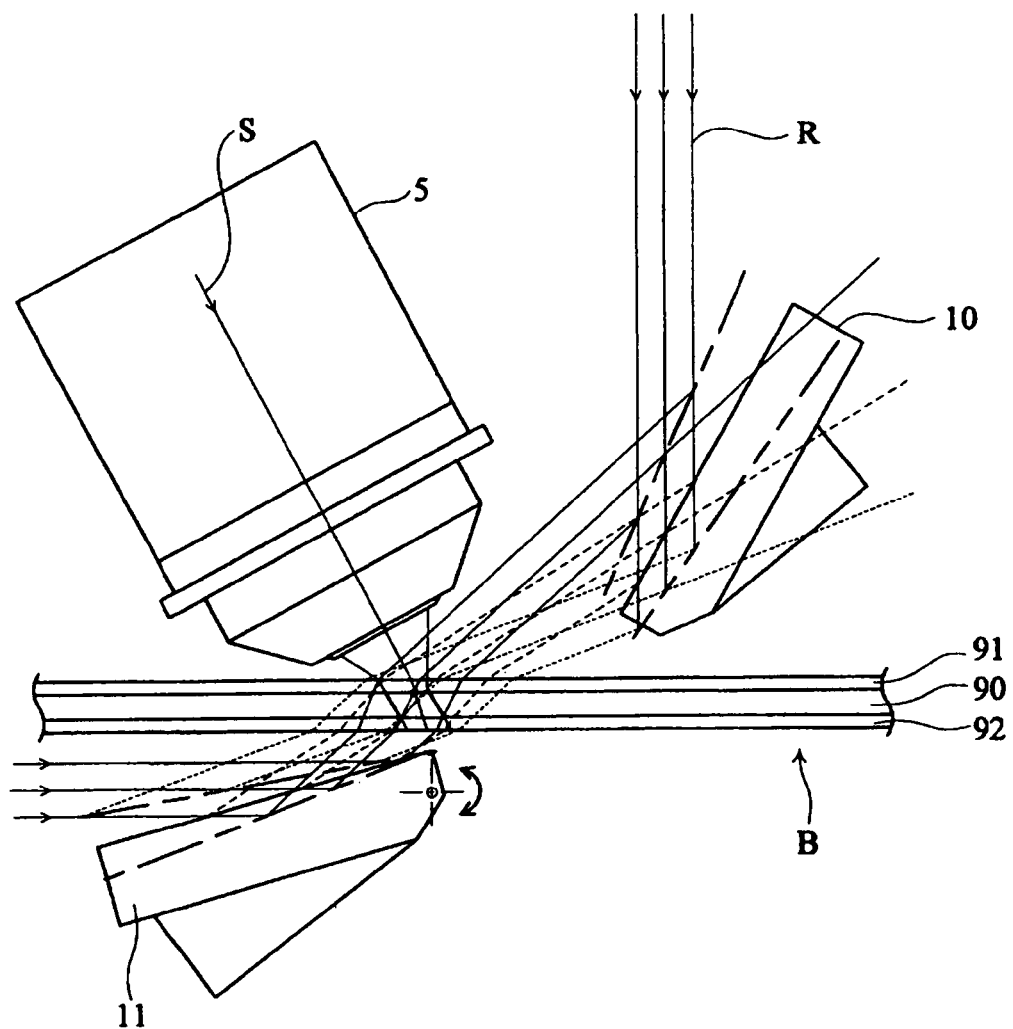
FIG. 2 is an enlarged front view of the hologram recording apparatus in FIG. 1.

FIGS. 1 to 4 show one embodiment of the hologram recording apparatus according to the invention. As shown in FIGS. 1 and 2, the hologram recording apparatus A of this embodiment projects recording light S onto a predetermined region of a disc-shaped hologram recording medium B at a certain incident angle. Simultaneously, the hologram recording apparatus projects reference light R at an incident angle that is intermittently changed relative to the predetermined region, whereby holograms corresponding to the incident angles of the reference light R are multiply-recorded onto the predetermined region by the interference between the recording light S and the reference light R. After the holograms have been recorded onto one predetermined region by the multiple-recording process, the hologram recording medium B is rotated a predetermined angle, and holograms are recorded onto the next predetermined region by the multiple-recording process. Such intermittent operations are repeatedly performed, thereby to record many holograms over the whole hologram recording medium B.

The hologram recording apparatus A includes an optical system for recording light, for projecting the recording light S, and an optical system for the reference light, for projecting the reference light R onto the hologram recording medium B while controlling the incident angle. Further, the hologram recording apparatus A includes constituents not shown, such as a light source for emitting laser light (not shown), a beam splitter (not shown) for splitting the laser light into the recording light S and the reference light R, and a collimator lens for converting the laser light into parallel light. The optical system for recording light includes a spatial light modulator 2, zoom lenses 3, a beam splitter 4, and an objective lens 5. The optical system for reference light includes a recording mirror 10, a reconstructing mirror 11, and an incident-angle variation projection unit 20 which changes the incident angle of the reference light R by unitarily moving the mirrors 10 and 11 on both sides of the hologram recording medium B. The incident-angle variation projection unit 20 includes a U-shaped arm member 21, a drive motor 22, and a drive circuit 23 for the drive motor 22 (refer to FIG. 3). The recording mirror 10 is arranged on the upper surface side of the hologram recording medium B, and is fixed to one end of the arm member 21. The reconstructing mirror 11 is fixed to the other end of the arm member 21, which is arranged on the lower surface side of the hologram recording medium B. The arm member 21 is moved by the drive motor 22 around a predetermined axis which extends along the radial direction of the hologram recording medium B. The optical systems for recording light and for reference light are mounted on a moving head (not shown) which can reciprocate in the radial direction of the hologram recording medium B.

As shown in FIG. 2, the hologram recording medium B has a structure in which a recording layer 90 of, for example, photopolymer, is formed as an intermediate layer, and transparent cover layers 91 and 92 are stacked on both sides of the recording layer 90. In this embodiment, by way of example, the thickness of the recording layer 90 is about 1 mm, and the thickness of each of the cover layers 91 and 92 is about 0.5 mm. In a recording mode, the recording light S and the reference light R are projected onto the upper surface side of the hologram recording medium B. In a reconstruction mode, only the reference light R is projected onto the lower surface side of the hologram recording medium B.

The laser light emitted from the light source, not shown, is converted into parallel light by the collimator lens, not shown, and the parallel light is thereafter split into the recording light S and the reference light R through the beam splitter, not shown. The recording light S is guided to the spatial light modulator 2, while the reference light R is guided to the recording mirror 10 or the reconstructing mirror 11.

The spatial light modulator 2 is made up of, for example, a liquid crystal device of transmission type, and it modulates the incident laser light into the recording light S in a two-dimensional pixel pattern corresponding to information to-be-recorded. The recording light S emitted from the spatial light modulator 2 is guided to the beam splitter 4 through the zoom lenses 3, and it is finally projected onto the predetermined region of the hologram recording medium B through the objective lens 5. The objective lens 5 is fixed in such a manner that its optic axis defines a certain inclination to the hologram recording medium B.

As shown in FIG. 2, the recording mirror 10 and the reconstructing mirror 11 are capable of moving about predetermined axes through the arm member 21. The recording mirror 10 is arranged obliquely above the predetermined region of the hologram recording medium B in proximity to the objective lens 5, and it reflects the reference light R which has proceeded along an optical path being substantially perpendicular to the hologram recording medium B, obliquely downwards toward the predetermined region. The reconstructing mirror 11 is arranged obliquely below the predetermined region on the side opposite to the objective lens 5 for the recording light S with respect to the hologram recording medium B, and it reflects the reference light R which has proceeded substantially in parallel with the hologram recording medium B, obliquely upwards toward the predetermined region.

Figure 3:
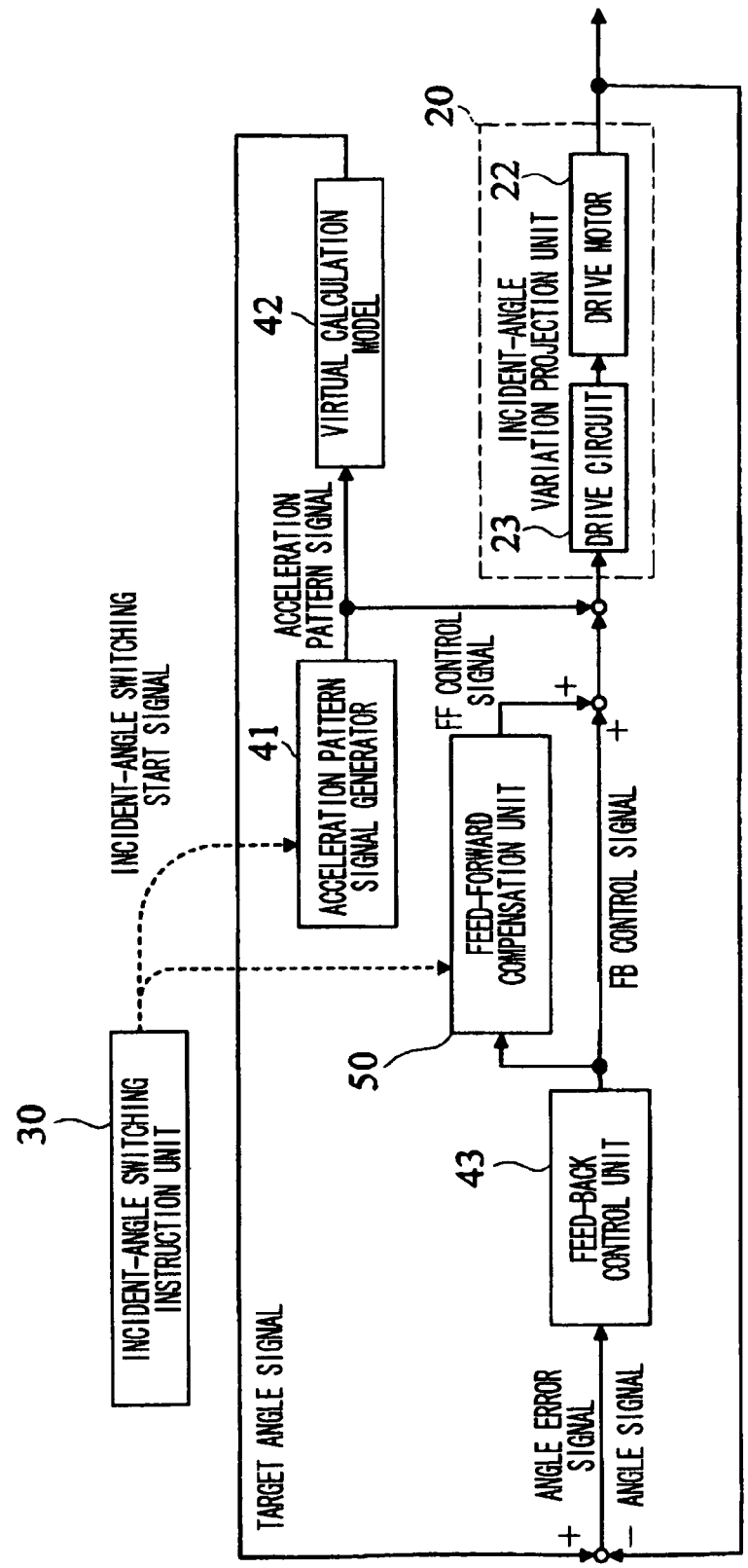
FIG. 3 is a block diagram showing the control functions of the hologram recording apparatus in FIG. 1.

The recording light S is condensed by the objective lens 5, and is projected so as to be superposed on the reference light R in the predetermined region. The objective lens 5 is fixed obliquely with respect to the hologram recording medium B. Therefore, although the recording mirror 10 is disposed near the objective lens 5, it can be widely moved, and it can finely change the incident angle of the reference light R in a comparatively wide range. Thus, the holograms of interference fringe patterns which differ in accordance with the incident angles of the reference light R are multiple-recorded onto the predetermined region of the hologram recording medium B. By the way, in recording the hologram, the recording light S and the reference light R are simultaneously projected in a state where the incident angle of the reference light R is stopped at a desired angle. In a multiplexed recording mode, the recording mirror 10 is intermittently moved so as to change the incident angle of the reference light R. In order to incarnate such intermittent movements, the hologram recording apparatus A comprises an incident-angle switching instruction unit 30, an acceleration pattern signal generator 41, a virtual calculation model 42, a feed-back control unit 43, and a feed-forward compensation unit 50 as shown in FIG. 3.

The incident-angle switching instruction unit 30 is configured of, for example, a host controller, and it gives a switching instruction at a predetermined timing as to the incident angle of the reference light R. By way of example, in a case where the incident angle is changed every certain angle in a certain cycle, an incident-angle switching start signal is outputted every certain time period from the incident-angle switching instruction unit 30. Alternatively, in a case where a projection time period is gradually lengthened more as the incident angle becomes larger, incident-angle switching start signals are outputted from the incident-angle switching instruction unit 30 while output timings are gradually delayed more and more.

The acceleration pattern signal generator 41 generates an acceleration pattern signal for starting the drive motor 22 each time the incident-angle switching start signal is inputted. The virtual calculation model 42 executes input/output processes which are performed by the drive motor 22 and the drive circuit 23 in accordance with the input of the acceleration pattern signal, virtually by a calculation. The virtual calculation model 42 generates an angle signal as a target value (target angle signal) on the basis of the acceleration pattern signal, and sends the target angle signal to the feed-back control unit 43.

The feed-back control unit 43 operates an incident-angle variation projection unit 20 (the drive motor 22 and the drive circuit 23) by a feed-back control every time the switching instruction of the incident angle is outputted. Incidentally, the drive motor 22 is furnished with a rotary encoder for detecting a rotational angle, and the rotational angle detected by the encoder is returned to the feed-back control unit 43 as an angle signal corresponding to the incident angle. More specifically, on the basis of the angle signal from the incident-angle variation projection unit 20 and the target angle signal from the virtual calculation model 42, an angle margin signal which indicates the difference of these angle signals is generated, and the angle margin signal is inputted to the feed-back control unit 43. The feed-back control unit 43 generates a feed-back control signal (hereinbelow, termed the "FB control signal") on the basis of such an angle margin signal, and it outputs the FB control signal to the drive circuit 23.

Figure 4:
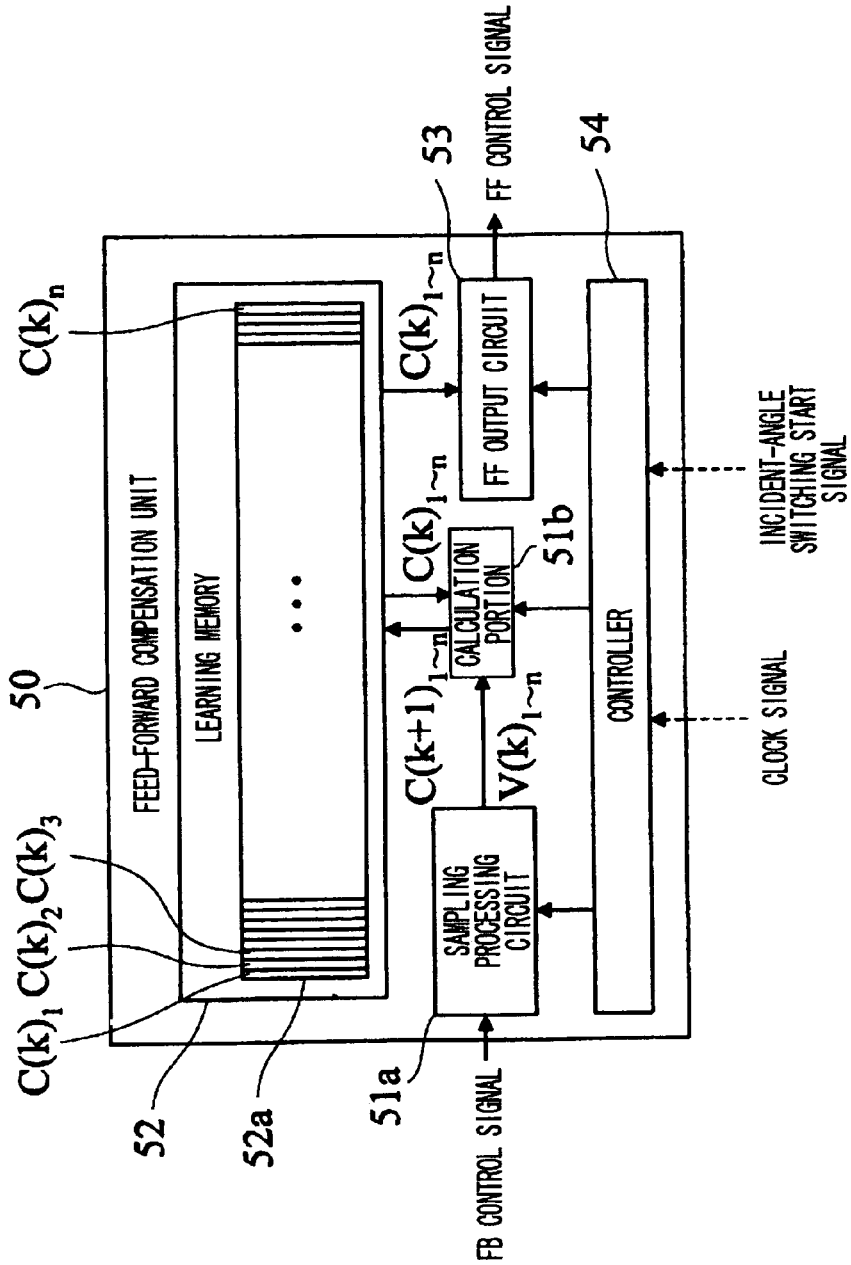
FIG. 4 is a block diagram showing the internal functions of a feed-forward compensation unit in FIG. 3.

The feed-forward compensation unit 50 accepts the FB control signal which is outputted from the feed-back control unit 43 every time the switching instruction of the incident angle is outputted, and it makes a feed-forward compensation as to the next FB control signal on the basis of the accepting FB control signal. As shown in FIG. 4, the feed-forward compensation unit 50 has a sampling processing circuit 51a, a calculation portion 51b, a learning memory 52, a feed-forward output circuit 53, and a controller 54.

The sampling processing circuit 51a accepts the FB control signal every time the switching instruction of the incident angle is outputted, and digitizes the signal waveform of the FB control signal by sampling processing. Digital data $V_{1-n}$ (hereinbelow, termed the "FB data") which corresponds to the FB control signal is outputted from the sampling processing circuit 51a. Here, a suffix "n" indicates the number of samplings. The calculation portion 51b executes a predetermined calculation by using the FB data $V_{1-n}$ and data $C_{1-n}$ (hereinbelow, termed the "learning waveform data") which is held in the learning memory 52. Concretely, the calculation portion 51b executes the calculation of $C(k+1)_{1-n} = C(k)_{1-n} + G \bullet V(k)_{1-n}$. Here, a suffix "k" indicates the order of the switching instruction of the incident angle, and "G" indicates a learning gain number by which the FB control signal is multiplied (and which is, in general, not greater than 1). $C(k+1)_{1-n}$ is the learning waveform data which is obtained as the output result of the calculation portion 51b. $C(k)_{1-n}$ is the learning waveform data which is invoked from the learning memory 52 in case of the calculation. By way of example, when the switching instruction of the incident angle is the kth, the learning waveform data $C(k)_{1-n}$ is outputted from the learning memory 52, while the content of the learning memory 52 is updated into the next learning waveform data $C(k+1)_{1-n}$. The learning memory 52 has a memory block 52a for individually holding the learning waveform data $C_{1-n}$ along with a number corresponding to the number of samplings. The feed-forward output circuit 53 invokes the learning waveform data $C_{1-n}$ from the learning memory 52 every switching instruction of the incident angle, and it outputs a signal corresponding to the learning waveform data $C_{1-n}$, so as to be added to the FB control signal as a feed-forward control signal (hereinbelow, termed the "FF control signal"). The controller 54 controls the input/output processes of the whole compensation unit 50.

Next, the learning control operation of the hologram recording apparatus A will be described.

In a case, for example, where the incident angle of the reference light R is intermittently changed every certain angle in the certain cycle, the incident-angle switching instruction unit 30 outputs the incident-angle switching start signal to the acceleration pattern signal generator 41 and the feed-forward compensation unit 50 at intervals of a predetermined time period.

The acceleration pattern signal generator 41 outputs the acceleration pattern signal in accordance with the input of the incident-angle switching start signal. The acceleration pattern signal is inputted to the drive circuit 23 for the drive motor 22 and to the virtual calculation model 42.

Figure 5:
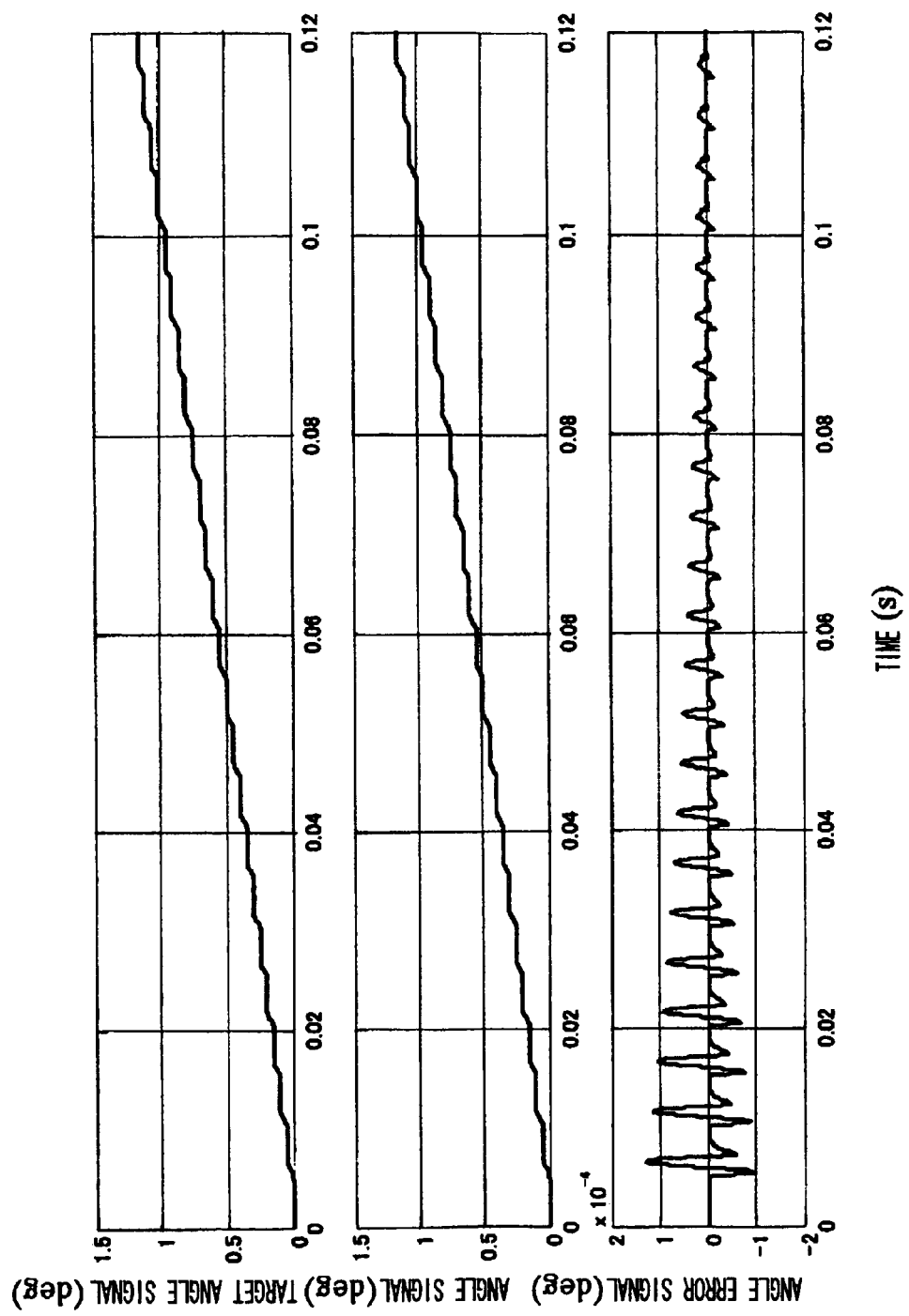
FIG. 5 is a signal waveform diagram for explaining a control operation at learning.

When the drive circuit 23 accepts the acceleration pattern signal from the acceleration pattern signal generator 41, the drive motor 22 is actuated accordingly. The angle signal is sequentially outputted from the rotary encoder of the drive motor 22. Additionally, when the virtual calculation model 42 accepts the acceleration pattern signal from the acceleration pattern signal generator 41, the target angle signal is sequentially outputted from the virtual calculation model 42 accordingly. The angle margin signal indicating the difference is generated by utilizing the angle signal and the target angle signal. This angle margin signal is inputted to the feed-back control unit 43 (regarding the waveforms of the individual signals, refer to FIG. 5).

When the feed-back control unit 43 accepts the angle margin signal, it outputs the FB control signal corresponding to this angle margin signal. The FB control signal is a cyclic signal which is synchronized with the incident-angle switching start signal. The FB control signal is outputted to the drive circuit 23, and also to the feed-forward compensation unit 50 (regarding the waveform of the FB control signal, refer to FIG. 6).

Figure 7:
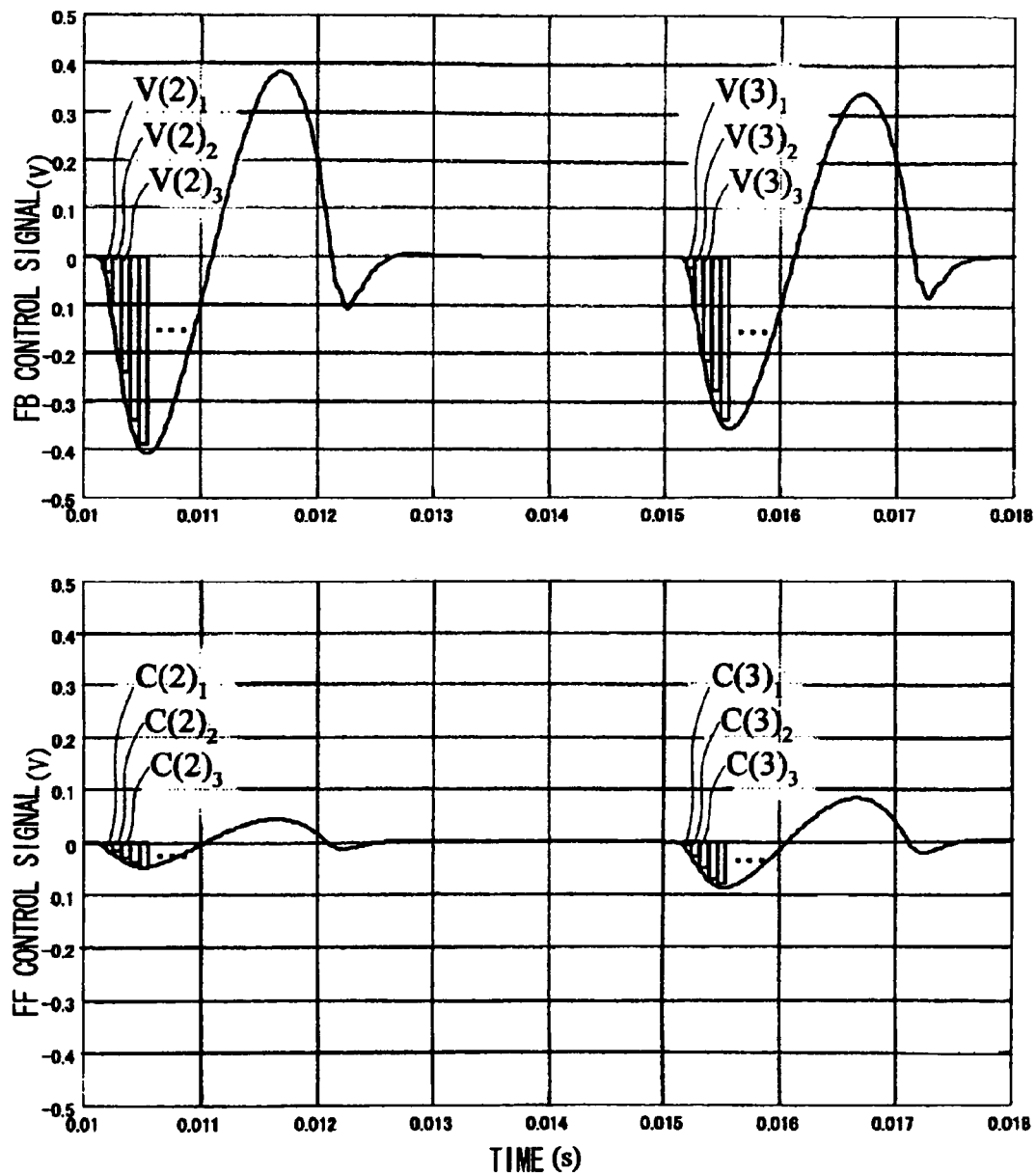
FIG. 7 is a signal waveform diagram with parts of FIG. 6 enlarged.

The feed-forward compensation unit 50 converts the cyclically changing FB control signal, into digital signals every cycle by the sampling processing circuit 51a. The sampling processing circuit 51a executes the sampling processing in a synchronized manner with a clock signal accepted by the controller 54. Thus, the FB data $V(k)_{1-n}$ corresponding to the FB control signals for one cycle are acquired. As shown in FIG. 7, by way of example, FB data $V(2)_{1-n}$ are obtained from the FB control signal of the second cycle (k=2), and FB data $V(3)_{1-n}$ are obtained from the FB control signal of the third cycle (k=3). The FB data $V(k)_{1-n}$ are outputted to the calculation portion 51b.

The calculation portion 51b executes the calculation formula of $C(k+1)_{1-n} = C(k)_{1-n} + G \bullet V(k)_{1-n}$. That is, the calculation portion 51b multiplies the FB data $V(k)_{1-n}$ accepted from the sampling processing circuit 51a, by the gain G, and then adds values ($G \bullet V(k)_{1-n}$) obtained consequently, to the learning waveform data $C(k)_{1-n}$ held in the learning memory 52. Thus, the next learning waveform data $C(k+1)_{1-n}$ are stored in the learning memory 52. The learning waveform data $C(k+1)_{1-n}$ are kept stored in the memory block 52a of the learning memory 52 until the next FB control signal of the (k+1)th cycle is outputted. At the output of the FB control signal of the kth cycle, the learning waveform data $C(k)_{1-n}$ are kept stored in the learning memory 52, and the learning waveform data $C(k)_{1-n}$ are outputted to the feed-forward output circuit 53.

Figure 6:
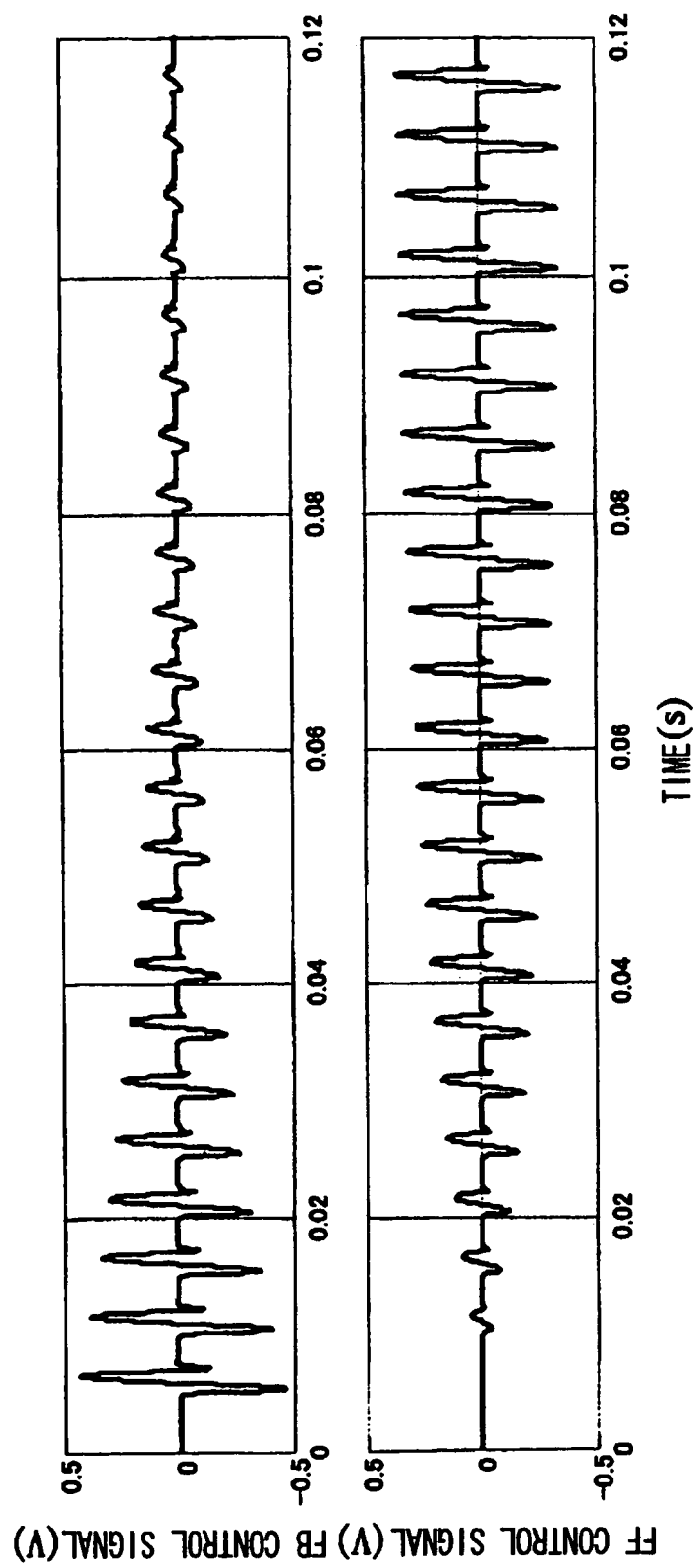
FIG. 6 is a signal waveform diagram for explaining a control operation at the learning.

The FF control signal corresponding to the learning waveform data $C(k)_{1-n}$ is outputted from the feed-forward output circuit 53 (regarding the waveform of the FF control signal, refer to FIGS. 6 and 7). As shown in FIG. 7, by way of example, the learning waveform data $C(2)_{1-n}$ of the second cycle (k=2) are outputted as the FF control signal of the second cycle, and the learning waveform data $C(3)_{1-n}$ of the third cycle (k=3) are outputted as the FF control signal of the third cycle. Incidentally, the series of processing steps concerning the learning waveform data $C(k)_{1-n}$ are called the "learning process", and such learning processes are cyclically executed in synchronism with the incident-angle switching start signals. The learning processes may well be continuously executed with the incident-angle switching start signal as a trigger. Additionally, when the FB control signal has become a predetermined signal level or below, the subsequent learning processes may well be ended.

In short, the FF control signal corresponding to the learning waveform data $C(k)_{1-n}$ of the kth cycle is added to the FB control signal outputted in the kth cycle, and the resulting sum is inputted to the drive circuit 23. The learning waveform data $C(k)_{1-n}$ of the kth cycle are generated using the learning waveform data $C(k-1)_{1-n}$ of one cycle before ((k−1)th cycle) and the FB data $V(k-1)_{1-n}$ corresponding to the FB control signal. Thus, the FB control signal, which is cyclically changed in accordance with the switching instruction of the incident angle, is gradually attenuated in such a way that the feed-forward compensation is made using the learning waveform data $C(k-1)_{1-n}$, as shown in FIGS. 6 and 7. As a result, the operation of intermittently changing the incident angle is stabilized with regard to the drive motor 22.

Figure 8:
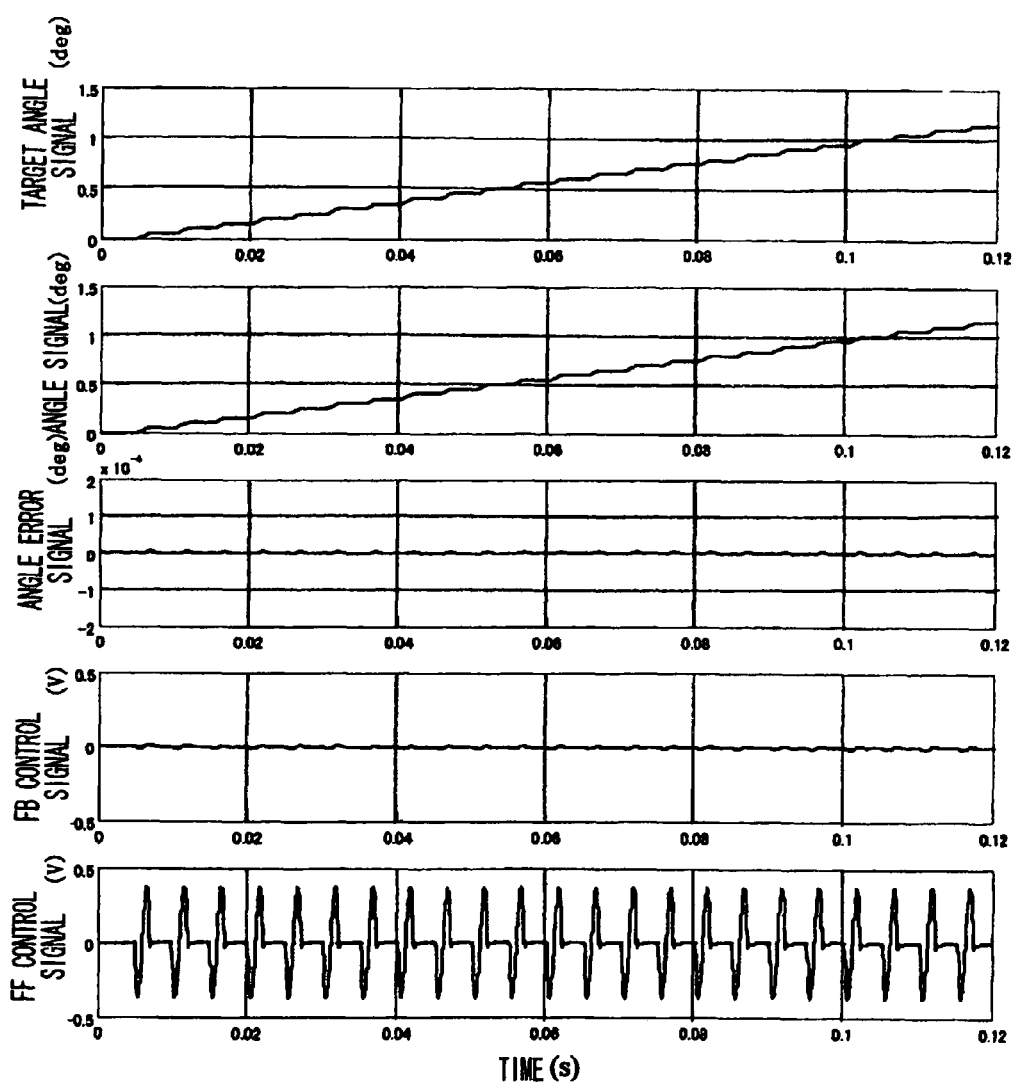
FIG. 8 is a signal waveform diagram for explaining a control operation after the learning.

When the number of the repetition times of the learning processes has reached a predetermined number of times in the above way, the subsequent learning processes are canceled by a cancelling unit, whereupon the feed-forward compensation unit 50 holds the learning waveform data $C(k)_{1-n}$ held in the learning memory 52, as they are without being updated. That is, after the learning processes have been executed the predetermined sufficient number of times, the identical learning waveform data $C(k)_{1-n}$ are always used for every switching instruction of the incident angle, and the FF control signal corresponding to the learning waveform data $C(k)_{1-n}$ is outputted. According to such a control operation after the learning, the drive motor 22 can be operated by a feed-forward control on the basis of the learning waveform data $C(k)_{1-n}$ which have converged to some extent. As shown in FIG. 8, although the angle margin signal changes cyclically in accordance with the switching instructions of the incident angle, it becomes a feeble signal, whereby the FB control signal can also be stably outputted with an almost constant signal level.

On the other hand, in a case, for example, where the incident angle is intermittently changed so as to gradually lengthen the projection time period of the reference light R more as the incident angle thereof is enlarged more, the incident-angle switching instruction unit 30 gradually enlarges the cycles of the incident-angle switching start signal more. Thus, in addition, the cycles of the acceleration pattern signal become larger gradually, and the cycles of the target angle signal, which are outputted from the virtual calculation model 42, and the cycles of the angle signal, which are outputted from the incident-angle variation projection unit 20, accordingly become larger gradually (refer to FIG. 9).

Figure 9:
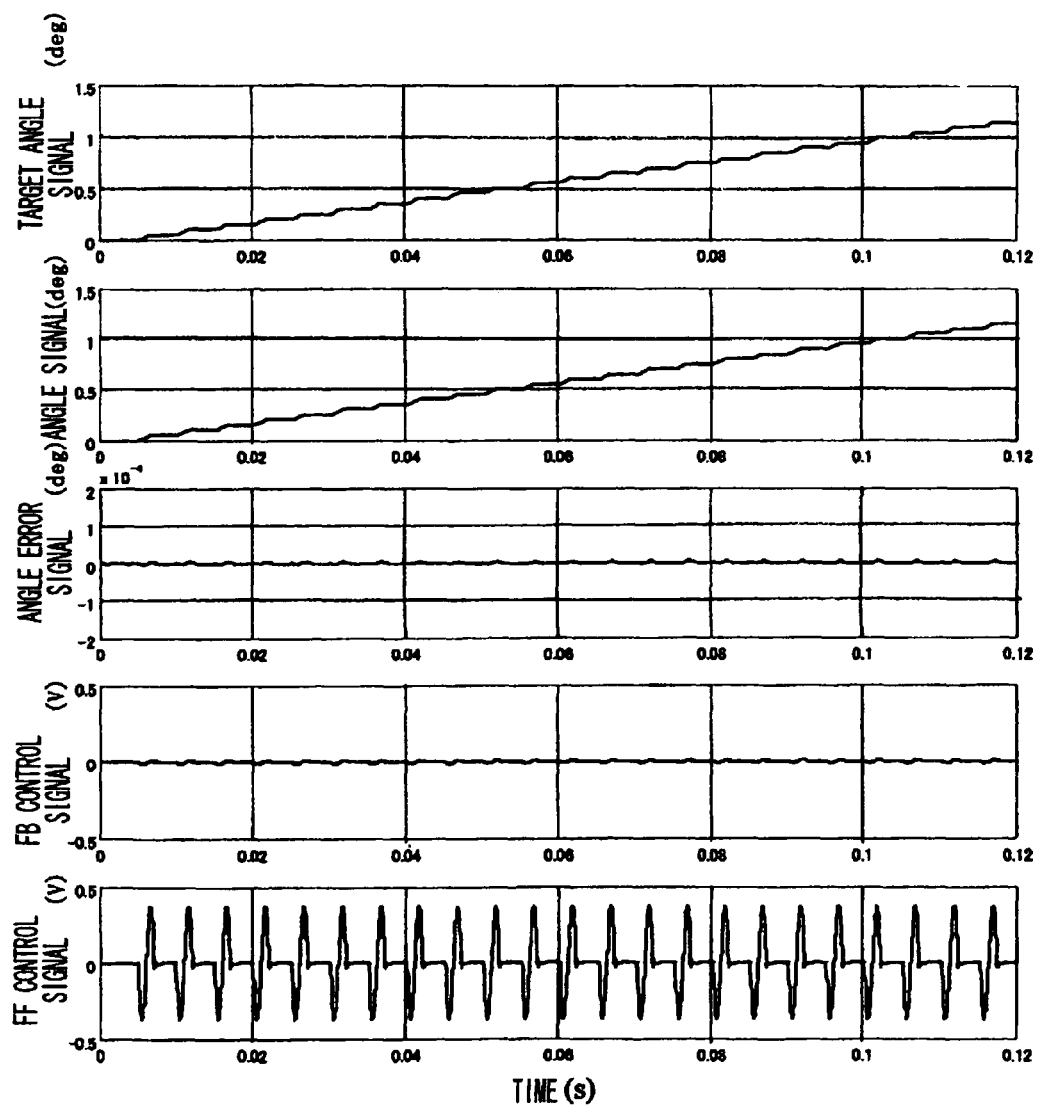
FIG. 9 is a signal waveform diagram for explaining a control operation at the learning.

As a result, as shown in FIG. 9, the angle margin signal, which indicates the difference between the angle signal and the target angle signal, is inputted to the feed-back control unit 43 while its temporally fluctuating cycle gradually becomes larger. Even with such an angle margin signal, the feed-back control unit 43 outputs the FB control signal in a synchronized manner with the fluctuating cycle of this angle margin signal, in the same manner as in the case where the incident angle is intermittently changed every certain angle in the certain cycle. Also such an FB control signal is updated by the feed-forward compensation unit 50, with the result that the FB control signal is gradually attenuated because the feed-forward compensation is made. Thus, the operation in which the drive motor 22 changes the incident angle intermittently is stabilized.

Accordingly, the hologram recording apparatus A of this embodiment can operate the drive motor 22 by the feed-back control while the feed-forward compensation is being made every switching instruction of the incident angle, either in the case where the incident angle of the reference light R is intermittently changed every certain angle in the certain cycle, or in the case where the incident angle is intermittently changed every certain angle while the cycle for changing the incident angle is being gradually enlarged more. Thus, the stable intermittent operations can be realized, and in turn, holograms can be recorded at a high speed and at a high precision.

Figure 10:
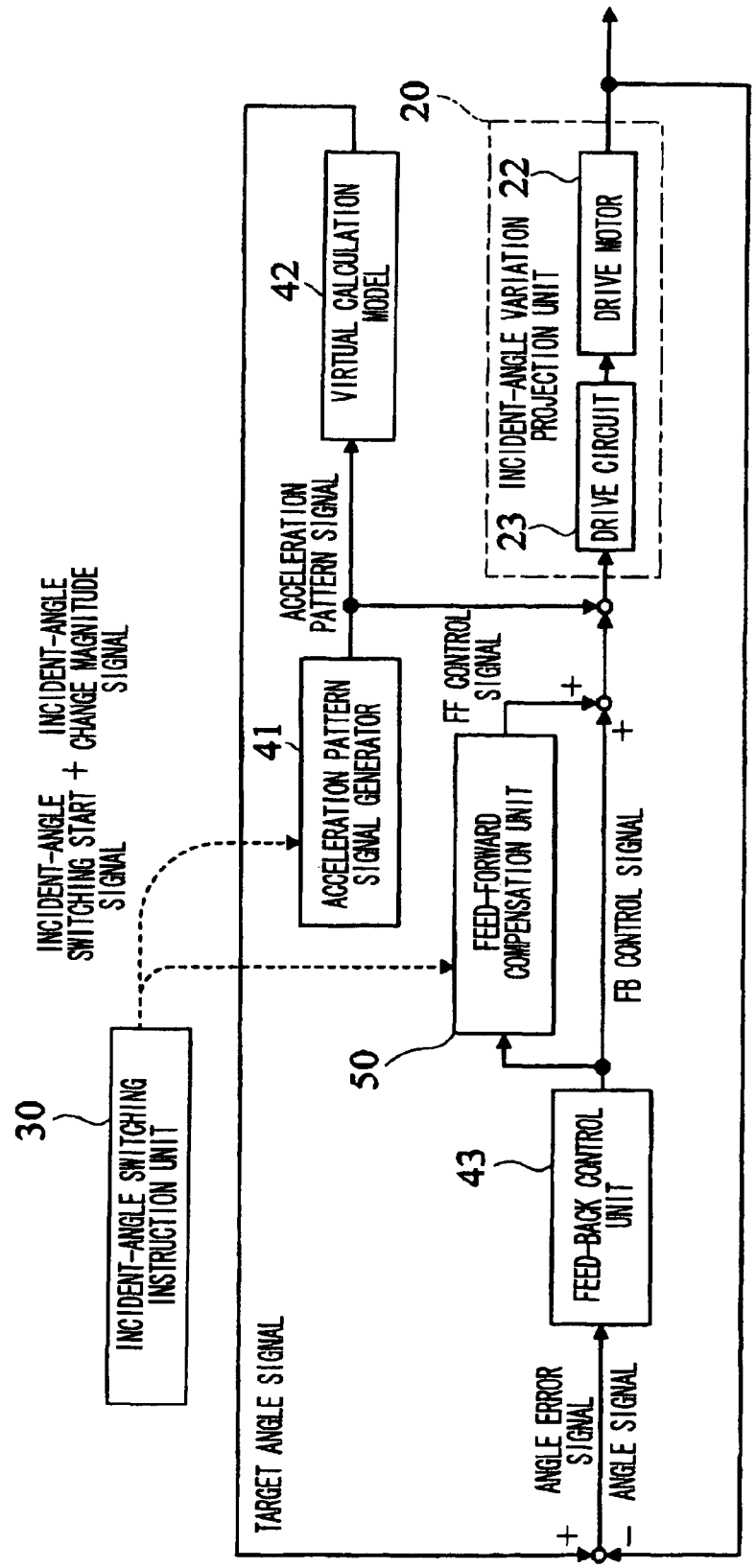
FIG. 10 is a block diagram showing the control functions of a hologram recording apparatus according to another embodiment.
Figure 11:
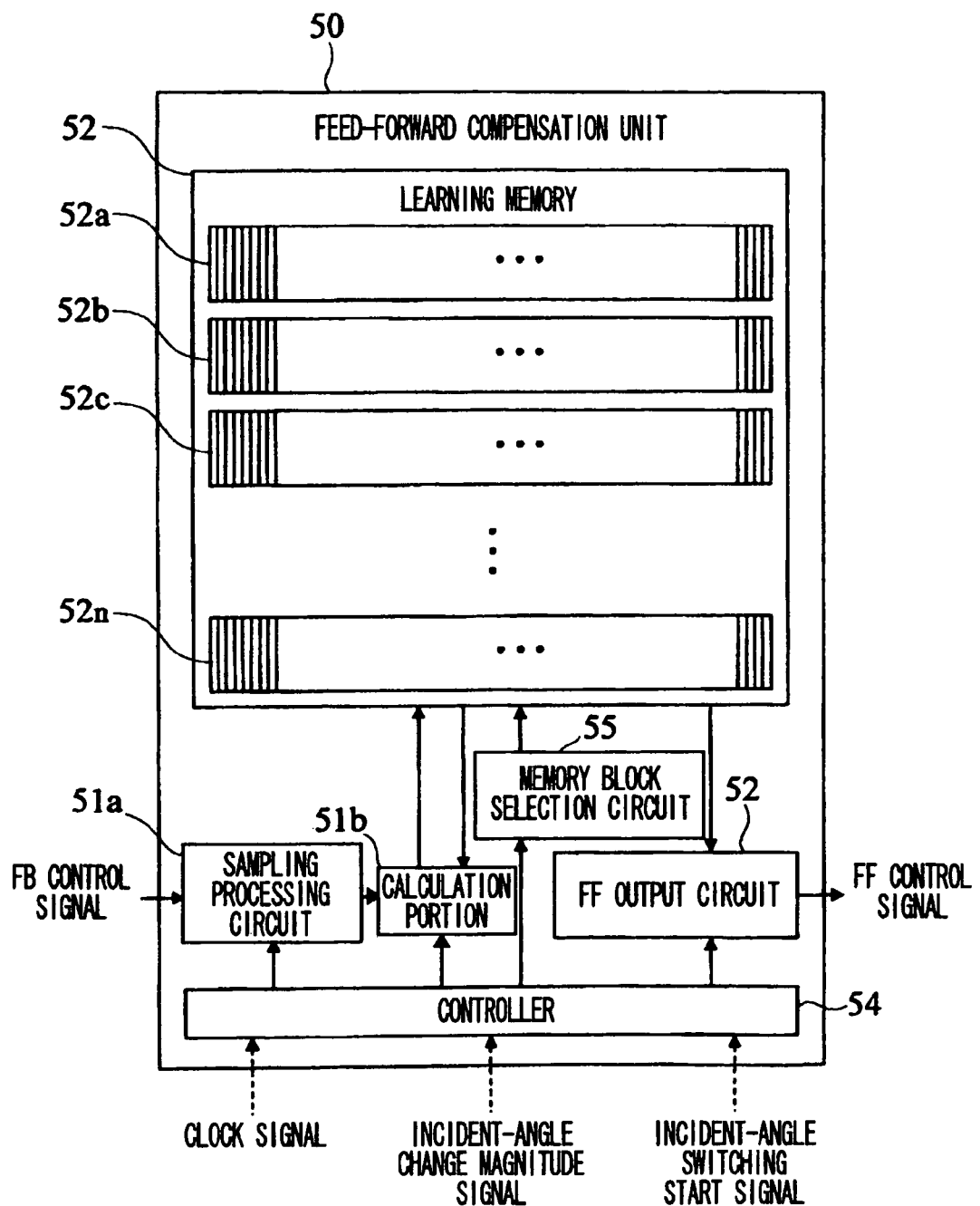
FIG. 11 is a block diagram showing the internal functions of a feed-forward compensation unit in FIG. 10.

FIGS. 10 and 11 show another embodiment of a hologram recording apparatus according to the invention. Incidentally, regarding constituents included in the hologram recording apparatus of this embodiment, components identical or similar to those of the foregoing embodiment will be assigned the same reference numerals and signs, and a description of such components will not be provided.

The hologram recording apparatus of this embodiment is suited to a case where the incident angle of reference light is intermittently changed with any desired change magnitude. For this purpose, an incident-angle switching instruction unit 30 outputs an incident-angle change magnitude signal for instructing the change magnitude of the incident angle, together with an incident-angle switching start signal. The incident-angle switching start signal and the incident-angle change magnitude signal are inputted to an acceleration pattern signal generator 41 and a feed-forward compensation unit 50, and the acceleration pattern signal generator 41 generates and outputs an acceleration pattern signal corresponding to the incident-angle change magnitude signal, each time the incident-angle switching start signal is inputted.

As shown in FIG. 11, the learning memory 52 of the feed-forward compensation unit 50 includes a plurality of memory blocks 52a-52n for storing therein learning waveform data which differ for the respective change magnitudes of the incident angle. Additionally, the feed-forward compensation unit 50 includes a memory block selection circuit 55 for selecting any of the memory blocks 52a-52n in accordance with the incident-angle change magnitude signal. Such a feed-forward compensation unit 50 executes a process similar to that of the foregoing embodiment as a learning process, and it outputs the corresponding learning waveform data obtained as the result of the learning, in accordance with the change magnitude of the incident angle.

According to the above configuration, in a case where the incident angle of the reference light is irregularly, intermittently changed with the desired change magnitudes, a drive motor 22 can be operated by a feed-back control while feed-forward compensations are being appropriately made in accordance with the respective incident-angle change magnitudes. Thus, in the hologram recording apparatus of this embodiment, stable intermittent operations can be realized, and in turn, holograms can be recorded at a high speed and at a high precision.

By the way, this embodiment has been described as performing a learning sequence during the operation of recording or reconstructing data, but the learning sequence can also be performed as a routine calibration immediately after the loading of a recording medium or during idling. When the learning sequence is previously performed in this manner, a control in which an angle margin is suppressed is incarnated from the beginning of the reconstruction.

What is claimed is:

1. A hologram recording apparatus wherein holograms corresponding to incident angles of reference light are multiple-recorded onto a hologram recording medium by interferences between recording light and the reference light, comprising:
   a recording light projection unit projecting the recording light modulated in accordance with recording information, onto a region of the hologram recording medium;
   a reference light projection unit projecting the reference light onto the hologram recording medium by intermittently changing an incident angle relative to the region;
   an incident-angle variation projection unit moving the reference light projection unit for intermittently changing the incident angle of the reference light;
   an incident-angle switching instruction unit giving an instruction for switching the incident angle;
   a feed-back control unit operating said incident-angle variation projection unit by a feed-back control when the switching instruction of the incident angle has been given; and
   a feed-forward compensation unit learning a feed-back control signal which is outputted every switching instruction of the incident angle from said feed-back control unit, and making a feed-forward compensation as to a next feed-back control signal on the basis of a result of the learning.

2. A hologram recording apparatus according to claim 1, further comprising:
   an acceleration pattern signal generation unit generating an acceleration pattern signal which serves to activate said incident-angle variation projection unit every switching instruction of the incident angle; and
   a virtual calculation unit virtually and calculationally executing input and output processes which are executed by said incident-angle variation projection unit in accordance with an input of the acceleration pattern signal, and outputting a target angle signal which becomes a target value in case of changing the incident angle;
   wherein said feed-back control unit generates the feed-back control signal on the basis of a difference between an angle signal concerning the incident angle as outputted from said incident-angle variation projection unit and the target angle signal which is outputted from said virtual calculation unit, and further wherein said feed-back control unit outputs the feed-back control signal to said incident-angle variation projection unit.

3. A hologram recording apparatus according to claim 2, wherein said feed-forward compensation unit further comprises:

a cancelling unit cancelling any subsequent learning operation and merely outputting a learnt output when the number of times which the feed-back control signals have been repeatedly learnt has reached a predetermined number of times.

4. A hologram recording apparatus according to claim 1, wherein said feed-forward compensation unit further comprises:
a sampling processing circuit accepting the feed-back control signal every switching instruction of the incident angle, and digitally converting a signal waveform of the feed-back control signal by sampling processing;
a calculation portion subjecting digital data outputted from said sampling processing circuit to a predetermined calculation;
a learning memory storing an output result of said calculation portion as learning waveform data; and
a feed-forward output circuit which invokes the learning waveform data from said learning memory every switching instruction of the incident angle, and adds a signal corresponding to the learning waveform data, to the feed-back control signal.

5. A hologram recording apparatus according to claim 4, wherein said feed-forward compensation unit further comprises:
a cancelling unit cancelling any subsequent learning operation and merely outputting the learnt output when the number of times which the feed-back control signals have been repeatedly learnt has reached a predetermined number of times.

6. A hologram recording apparatus according to claim 1, wherein said incident-angle switching instruction unit further comprises:
a rotating unit rotating the hologram recording medium in which is of a disc shape, a predetermined angle when the holograms have been recorded onto the region of the disc-shaped hologram recording medium in the multiplexed fashion;
wherein holograms are recorded onto a next region of the disc-shaped hologram recording medium in a multiplexed fashion; and
such intermittent operations are repeated until holograms are recorded onto the whole disc-shaped hologram recording medium.

7. A hologram recording apparatus according to claim 6, wherein said feed-forward compensation unit further comprises:
a cancelling unit cancelling any subsequent learning operation and merely outputting the learnt output when the number of times which the feed-back control signals have been repeatedly learnt has reached a predetermined number of times.

8. A hologram recording apparatus according to claim 1, wherein said feed-forward compensation unit further comprises:
a cancelling unit cancelling any subsequent learning operation and merely outputting a learnt output when the number of times which the feed-back control signals have been repeatedly learnt has reached a predetermined number of times.

* * * * *